United States Patent [19]
Ludwig et al.

[11] 3,918,090

[45] Nov. 4, 1975

[54] SWITCHING ARRANGEMENT FOR THE AUTOMATIC DETECTION OF A RECORDABLE POINT ON A MOVING RECORDING CARRIER

[75] Inventors: Martin Ludwig, Munich; Rudolf Queisser, Geretsried; Hubert Schlossbauer, Krailling, all of Germany

[73] Assignee: Siemens Aktiengesellschaft, Berlin & Munich, Germany

[22] Filed: Dec. 18, 1974

[21] Appl. No.: 533,854

[30] Foreign Application Priority Data

Dec. 20, 1973 Germany ........................... 2363570

[52] U.S. Cl. ....................... 360/72; 360/71; 360/74

[51] Int. Cl.[2] ................ G11B 15/52; G11B 15/22; G11B 15/06

[58] Field of Search ............ 360/72, 71, 48, 74, 12, 360/27, 90; 226/30, 33, 143, 43, 49; 340/172.5; 179/100.1 VC, 100.1 DR; 35/35 C

[56] References Cited

UNITED STATES PATENTS

| | | | |
|---|---|---|---|
| 3,387,293 | 6/1968 | Stockebrand | 360/48 |
| 3,467,949 | 9/1969 | Moore | 360/72 |
| 3,541,271 | 11/1970 | Joslow et al. | 360/71 |
| 3,708,633 | 1/1973 | Nye et al. | 360/74 |
| 3,711,657 | 1/1973 | Niioka et al. | 360/71 |
| 3,714,382 | 1/1973 | Sykes | 360/72 |
| 3,812,532 | 5/1974 | Crosser et al. | 360/72 |

*Primary Examiner*—Alfred H. Eddleman
*Attorney, Agent, or Firm*—Hill, Gross, Simpson, Van Santen, Steadman, Chiara & Simpson

[57] ABSTRACT

A switching arrangement for automatically detecting a recordable point on a moving recording carrier includes a control circuit which is supplied with a first signal for causing detection of the recordable point and with reading pulses produced by data stored on the recording carrier to cause movement of the carrier in the forward direction after the occurrence of the first signal, while at the same time monitoring the occurrence of reading pulses. The control circuit further causes a movement of the carrier in the reverse direction when reading pulses do not occur after a predetermined interval, and causes movement of the carrier in the forward direction after a renewed occurrence of reading pulses. The control circuit provides a second signal which indicates the readiness for writing new data when the recording carrier is moved in the forward direction to such an extent that a predetermined distance is maintained between the data stored last and the data to be newly recorded.

12 Claims, 4 Drawing Figures

SWITCHING ARRANGEMENT FOR THE AUTOMATIC DETECTION OF A RECORDABLE POINT ON A MOVING RECORDING CARRIER

BACKGROUND OF THE INVENTION

1. Field of the Invention

This invention relates to a switching arrangement for automatic detection of a recordable point on a moving recording carrier, and is particularly concerned with such an arrangement for use with a magnetic tape system.

2. Description of the Prior Art

When storing data on a moving recording carrier, it is necessary that a memory containing the recording carrier be very quickly available for the recording of data. If, for example, the data are stored on a band-shaped recording carrier which is partially inscribed with information, it is necessary for operating personnel to detect a point which is available for recording data, the process involving testing of the carrier until an available recording location is found.

An example of a memory having a band-shaped recording carrier is a magnetic tape device. When a magnetic tape device is employed in a teleprinter, instead of a punched tape reader and a tape punch, data are read from the magnetic tape and recorded on the magnetic tape, usually with the same magnetic tape read/write device. Although a punched tape reader and a tape punch are two separate devices which are independent from one another, a magnetic tape device which carries out both functions can only alternate between the write and read operations.

For example, if during the reading of data from the magnetic tape in a teleprinter, additional data arrive which are to be recorded on the magnetic tape, is necessary that an information-free location be made available on the magnetic tape as quickly as possible. In addition, it is desired that the location be found without the aid of operating personnel.

SUMMARY OF THE INVENTION

The primary object of the invention is, therefore, to provide a switching arrangement for the automatic detection of an information free location on a moving recording carrier.

According to the invention, the above object is achieved with a switching arrangement of the initially mentioned type in that a control circuit is provided which is supplied with a first signal which causes the detection of the recordable location. The control circuit is also supplied with reading pulses produced by data stored on the recording carrier, causes movement of the recording carrier in the forward direction after the occurrence of the first signal, while monitoring the reading pulses, and causes a movement of the recording carrier in the reverse direction if no reading pulses occur after a predetermined period of time. The control circuit further causes a movement of the recording carrier in the forward direction after a renewed occurrence of reading pulses and emits a second signal which indicates the readiness of the apparatus for writing new data when the carrier is moved in the forward direction to an extent that ensures maintenance of a predetermined distance between the last stored data and the new data to be recorded.

The method, according to the present invention, has the advantage that a recordable location is rapidly detected on the moving carrier. In addition, the switching arrangement offers the advantage that the recordable location is automatically detected. Data which are already stored on the recording carrier cannot be erased by mistake and, thus, a permanency of the stored data, in this respect, is guaranteed. The switching arrangement offers, in addition, great safety with respect to operational errors.

A recordable location can be very rapidly found on the recording carrier, if during the detection procedure of the recordable location the recording carrier is moved with a speed which is greater than the speed provided for writing or reading of data.

The switching arrangement is employed in an advantageous manner when a magnetic tape is utilized as the recording carrier.

An advantageous embodiment of the control circuit is characterized by a first flip-flop which is set by the first signal and reset by the second signal, and having an output signal which controls the movement of the recording carrier. The control circuit is further characterized by a second flip-flop whose output signal controls the moving direction of the recording carrier and which is set by the first signal and reset by a first pulse. The control circuit is still further characterized by a first timing element which is actuated by the reading pulses to emit the first pulse at its output when no further data are present after the stored data and by a second timing element which provides the second signal at its output when a recordable location is found.

In order to guarantee that the recording carrier is stopped at the correct time after a recordable location has been detected, it is of particular advantage when the delay time of the second timing element is dimensioned in such a way that, after the writing of new data between these and store data, the given distance is maintained on the recording carrier.

In order to guarantee a fail-safe operation of the switching arrangement, even in the event that the first signal is applied over a longer period of time, it is advisable to provide a further timing element which is fed with the first signal and which gives off, at its output, a short pulse which sets the second flip-flop and which activates the first timing element.

In order to provide an automatic change of direction of the carrier from the backward direction to the forward direction, it is advantageous to provide a NAND circuit which receives the output signal of the second flip-flop and the reading pulses, and which sets the second flip-flop and activates the second timing element when, during reading, reading pulses occur during a carier movement in the rearward direction.

The switching arrangement is constructed exclusively of digitally operating switching elements, in a preferred form, when as first and second timing elements, counters are provided which are controlled by counting pulses and which give off a pulse each time a respective counter reaches a predetermined counting state.

In order to obtain the counting pulses, it is advantageous to provide a timing disc and a scanning head, which induce the generation of counting pulses when the recording carrier is moved.

BRIEF DESCRIPTION OF THE DRAWINGS

Other objects, features and advantages of the invention, together with its organization, construction, and operation will be best understood from the following detailed description of a preferred embodiment, taken in conjunction with the accompanying drawings, on which.

DESCRIPTION OF THE PREFERRED EMBODIMENT

Figure 1:
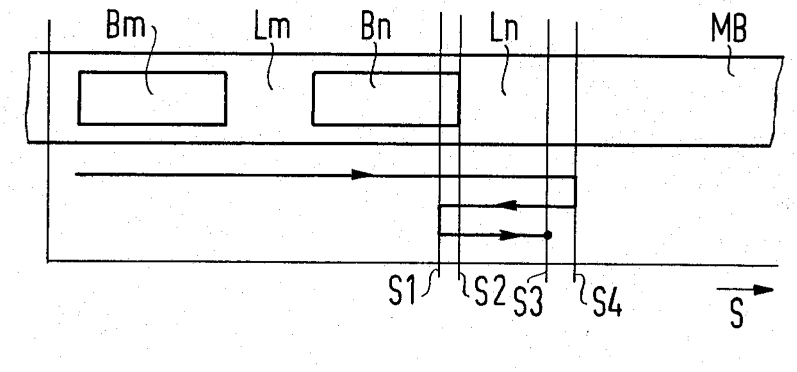
FIG. 1 is a schematic illustration of two data blocks recorded on a magnetic tape.

Store data are schematically illustrated in FIG. 1 in the form of two data blocks *Bm* and *Bn* as they are recorded in the longitudinal direction on a magnetic tape MB which serves as a recording carrier. In the *x* direction the distance S which the magnetic tape MB covers relative to a magnetic head is illustrated. The data blocks *Bm* and *Bn* are separated from each other by a block gap *Lm* having a length which is determined by the mechanical characteristics of the magnetic tape device.

It is assumed that the magnetic tape MB behind the data block *Bn* is erased. This erased, and thus recordable, location of the magnetic tape is to be found automatically, for example, after pressing a recording key, or after the arrival of a corresponding order to the magnetic tape device, as will be better understood from the description below.

Further details of FIG. 1 and the basic timing cycle in connection with the detection of the recordable location will be described in the following text, together with the distance-time diagram illustrated in FIG. 2.

Figure 2:
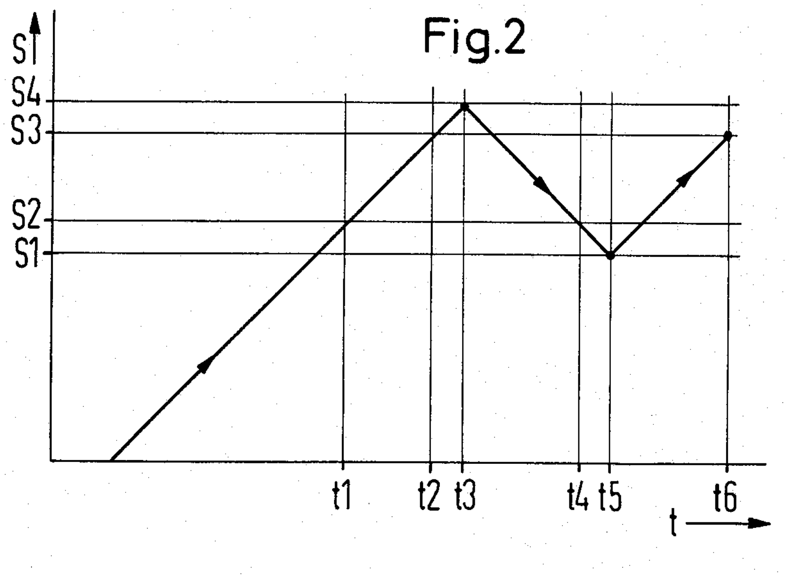
FIG. 2 is a graphic illustration of distance and time with respect to the positions of a magnetic tape, for example the tape illustrated in FIG. 1.

In the diagram of FIG. 2, the distance S covered by the magnetic tape MB is schematically illustrated as dependent upon the time *t*. The time *t* is marked in the *x* direction and the distance S is in the *y* direction.

The magnetic tape MB is moved in the forward direction. The speed of the magnetic tape MB should be greater than the speed which is utilized for reading or writing of the data blocks. It is assumed, for instance, that it is about one half of the speed with which the magnetic tape MB is rewound.

After the data blocks *Bm* and *Bn* have been identified, the end of the data block *Bn* and the beginning of the block gap *Ln* are determined at the time *t*1 at the point S2. The length of the block gap *Ln* is known and at the time *t*2, a new data block is expected at the point S3. Since the same is not present, the magnetic tape MB is stopped at the point S4 at the time *t*3. Subsequently, the magnetic tape MB is moved in the reverse direction for a sufficient time until at the time *t*4 at the point S2 the last data of the data block *Bn* are identified. Subsequently thereto, the magnetic tape MB is stopped again at the time *t*5 at the point S1. Then, the tape is moved in the forward direction for a distance until the block gap *Ln* is produced during the writing of a new data block. Therefore, at the time *t*6, the magnetic tape is stopped again at the point S3. Subsequently to this operation, the writing of a new data block can be initiated.

Figure 3:
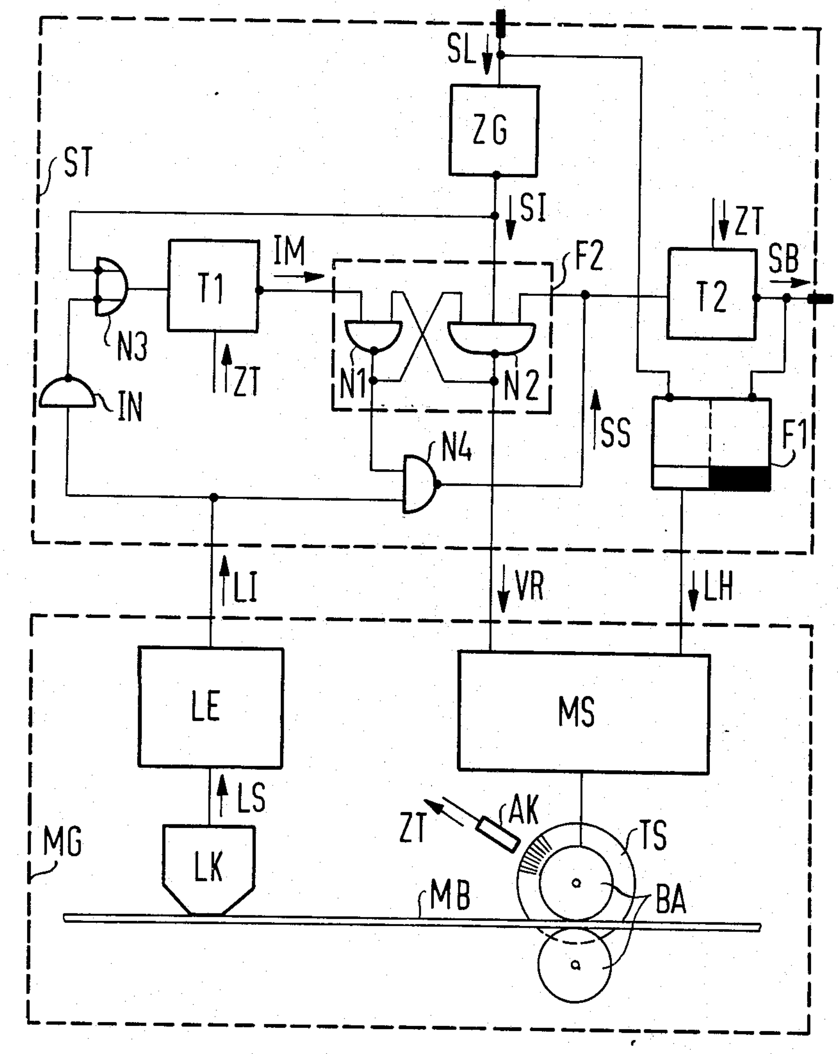
FIG. 3 is a circuit diagram of a switching arrangement constructed in accordance with the principles of the present invention.

FIG. 3 illustrates a preferred exemplary embodiment of a switching arrangement constructed in accordance with the principles of the invention. A control circuit ST controls the operation of detecting the recordable location. The control circuit ST comprises three timing elements ZG, T1 and T2, a flip-flop F1, four NAND elements N1 to N4 and an inverter IN. The pertinent parts of a magnetic tape device MG are illustrated in addition to the magnetic tape MB, a tape drive system BA, a motor control MS, a reading head LK and a reading circuit LE, all of which are per se well known in the art.

The control circuit ST provides a signal VR to the motor control MS, in a well known manner, to control the direction in which the magnetic tape MB is moved. A further signal LH is also emitted by a control circuit ST to effect the moving or stopping of the magnetic tape MB via the motor control MS, as is also per se well known in the art.

The data recorded on the magnetic tape MB are read by the reading head LK and provided to the reading circuit LE in the form of reading signals LS. The reading circuit LE produces, also in a manner well known in the art, reading pulses LI from the reading signals LS.

A signal SL is applied at an input of the control circuit ST when a recordable location is to be found on the magnetic tape MB. The signal SL may be provided by a push button switch or the like, or may be provided automatically in response to receipt of an order, in the form of a similar signal, to request detection of a recordable location. When the recordable location has been found, the control circuit ST emits a signal which indicates that the magnetic tape device MG is ready to record new data on the magnetic tape MB.

Further details of the circuit illustrated in FIG. 3 will be discussed below, in conjunction with the diagram of signals illustrated in FIG. 4.

Figure 4:
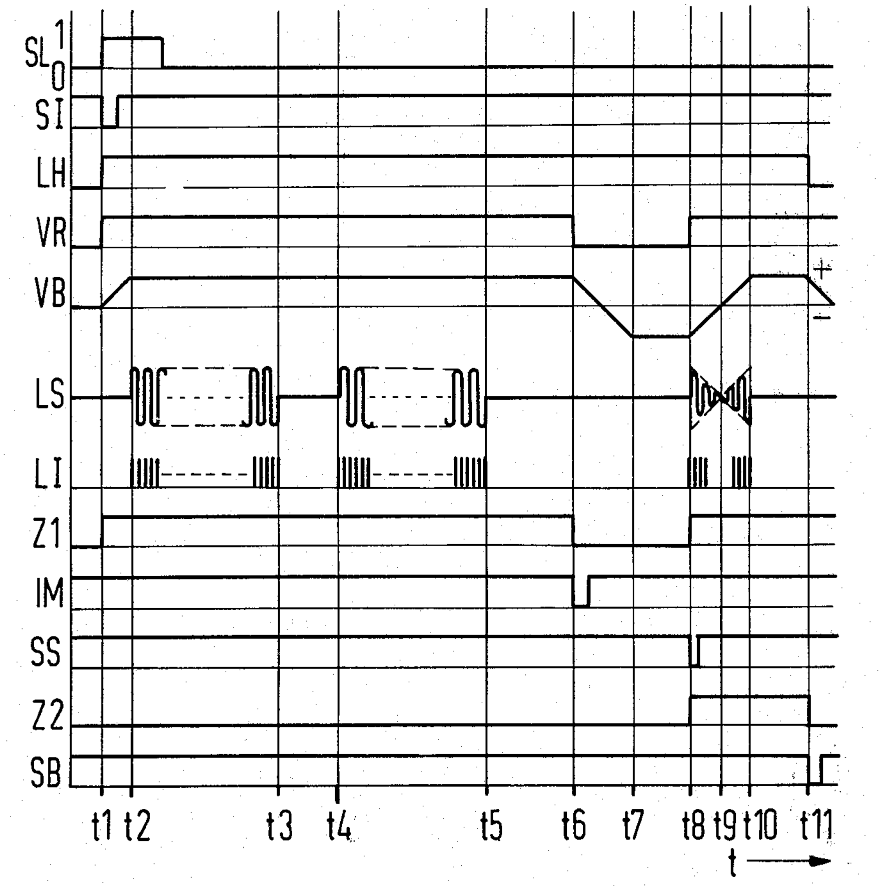
FIG. 4 is a signal and timing chart of signals at various points of the switching arrangement of FIG. 3 during operation thereof.

In the time diagram illustrated in FIG. 4, the time *t* is illustrated in the *x* direction and the amplitudes of the signals are illustrated in the *y* direction. In addition, an analog signal proportional to the speed VB of the magnetic tape MB is illustrated as it is provided, for example, by a speedometer, tachometer or the like, at the tape drive system BA. With the exception of the reading signals LS, all signals are binary signals which accept only the binary value identifications of "0" and "1". At the time t1, it is assumed that the signal SL changes its binary value from a binary 0 to a binary 1 and therefore sets the flip-flop F1. The signal LH at the output of the flip-flop F1 assumes the value of a binary 1 and therefore provides a running order to the motor control MS of the magnetic tape device MG. At the same time, the signal SL releases, via the timing element ZG, a negative pulse SI which sets the flip-flop F2 which comprises a pair of NAND gates N1 and N2. The signal VR which is provided at the output of the flip-flop F2 assumes the value of a binary 1 and therefore informs the motor control MS that the magnetic tape MB is to be moved in the forward direction. The motor control MS provides an order to the tape drive system BA which causes the tape drive system to move the magnetic tape MB in the forward direction.

In addition, the pulse SI releases, via the NAND gate N3 the timing element T1 which, after a delay time which is greater than the time assigned to a block gap, flips back into its rest position, unless it is released again by further pulses at its input. Such timing elements are known in the art as re-triggerable timing element. The speed of the timing element T1 is illustrated in FIG. 4 by a signal Z1. As long as the delay time is in progress, the signal Z1 has a value of a binary 1.

At the time *t*2, the speed VB of the magnetic tape MB is equal to the desired speed provided for the search of the recordable location on the magnetic tape MB.

When it is assumed that in front of the recordable location on the tape two data blocks *Bm* and *Bn* are recorded, the reading head LK emits the first reading signals LS at the time *t*2, which reading signals are associated with the data block Bm. The reading circuit LE evaluates the reading signals LS and produces the pulses LI therefrom. The pulses LI are fed, via the inverter IN and the NAND gate N3 to the timing element T1 and releases the circuit again so that it cannot flip back into its rest position.

At the time *t*3, the last character of the data block *Bm* is recognized and no further reading pulses LI are given off and the delay time runs out in the timing element T1. At the time *t*4, after the block gap *Lm*, the data block *Bn* is recognized. The reading circuit LE produces the reading pulses LI again from the signals LS. Since the delay time of the timing element T1 is greater than the time which is assigned to the block gap between the data blocks *Bn* and *Bm*, it has not returned to its rest position and is retriggered by the arriving reading pulses LI.

At the time *t*5 the last character of the data block *Bn* is recognized and no further reading pulses LI are generated. Therefore, the delay time again runs out in the timing element T1.

Up to the time *t*6, no further reading pulses LI are produced. The timing element T1 therefore assumes its rest position after its delay time, which is greater than the time assigned to the block gap *Ln*. It is assumed that no further data block follows the data block *Bn*.

The timing element T1 produces a short negative pulse IM at the expiration of its delay time which resets the flip-flop F2. The signal VR therefore assumes the value of a binary 0 and the motor control MS responds to effect a movement of the magnetic tape MB in the reverse direction.

At the time *t*7 the magnetic tape MB reaches its desired speed for a reading in the reverse direction. At the time *t*8 the reading circuit LE recognizes the last characters of the data block B*n*, The reading pulses LI again release the timing element T1 and, via a NAND gate N4, again set the flip-flop F2 by way of a negative pulse SS. The signal VR therefore again assumes the value of binary 1 and the motor control MS causes movement of the magnetic tape MB in the forward direction. At first, the magnetic tape MB is decelerated. It then comes to rest at the time *t*9 and reaches its desired speed in the forward direction again at the time *t*10.

The pulse SS has also released the second timing element T2 at the time *t*8. The delay time of the timing element T2 is dimensioned in such a way that after its expiration the magnetic tape MB is in a position which guarantees that the predetermined block gap L*n* is produced on the magnetic tape MB when after the data block B*n* a further data block is recorded.

In the event that a magnetic tape device MG is used in which the writing process begins immediately after the start of the magnetic tape MB, the delay time is, for example, equivalent to the time which is assigned to the block gap L*n*. The state of the timing element T2 is illustrated in FIG. 4 by a signal Z2 which assumes a state of a binary 1 during the running of the delay time.

At the time t11 the delay time of the timing element T2 has expired and a negative pulse SB is produced by the element T2 to reset the flip-flop F1. The signal LH therefore assumes the state of a binary 0 and the motor control MS causes a stopping of the magnetic tape MB. The pulse SB is emitted at an output of the control circuit ST and indicates that a recordable location has been found on the magnetic tape MB and that the magnetic tape device MG is ready for the recording of the new data block. The indication can, of course, be made a visual indication by well known detector and display circuits.

In a further improvement of the invention, particularly with respect to the exemplary embodiment illustrated in FIG. 3, the timing elements T1 and T2 of the control circuit ST may be replaced by counters which are controlled by a counting pulse ZT. If the counting pulse ZT is obtained by way of a scanning head AK and a timing disc TS, which is mounted on the drive axis of the motor in a tape drive system BA, a definite association between the position of the magnetic tape MB and the state of the control circuit ST is guaranteed at all times.

Many other changes and modifications of the invention, other than that set forth above, may become apparent to those skilled in the art without departing from the spirit and scope of the invention. We therefore intend to include within the patent warranted hereon all such changes and modifications as may reasonably and properly be included within the scope of our contribution to the art.

We claim:

1. A switching arrangement for automatically detecting an information-free recordable location on a moving recording carrier which has spaced information blocks recorded thereon, a carrier drive mechanism operable to selectively move the carrier in forward and reverse directions and a reading device operable to produce reading pulses in response to the movement of information stored on the carrier past the reading device, said arrangement comprising:

first means connected to the carrier drive mechanism to control the direction of carrier movement and operable in response to receipt of a search signal to cause movement of the carrier in the forward direction;

second means connected to the reading device and to said first means and operable after a predetermined interval from a last reading pulse of an information block to cause said first means to reverse the operation of the drive mechanism, and operable in response to renewed detection of reading pulses with the carrier moving in the reverse direction to again cause said first means to reverse operation of the drive mechanism to move the carrier in the forward direction; and third means connected to the reading device and to said first means and operable after a second predetermined interval after the renewed movement of the carrier in the forward direction to provide a readiness signal to indicate an information-free recordable location and to cause said first means to stop the operation of the drive mechanism.

2. A switching arrangement according to claim 1, wherein said recording carrier comprises a magnetic recording tape.

3. A switching arrangement according to claim 1, wherein said first means comprises:

a first flip-flop connected to the drive mechanism and connected to receive and be set by the search signal; and a second flip-flop connected to receive and be set by the search signal and connected to the drive mechanism for causing the carrier to move in the forward direction;

and said second means comprises a first time delay circuit connected to receive the search signal and to the reading device to reset said second flip-flop to cause movement of the carrier in the reverse direction when reading pulses are not received for a predetermined interval.

4. A switching arrangement according to claim 3, comprising a third time delay circuit connected to receive the search signal and connected to set said second flip-flop and initiate operation of said first time delay element at a time delayed from the setting of said first flip-flop.

5. A switching arrangement according to claim 3, wherein said first means further comprises means connected to the reading device and connected to set said second flip-flop in response to detection of stored information as the carrier moves in the reverse direction to cause the carrier to again move in the forward direction, and a second time delay circuit connected to the last-mentioned means and to said first flip-flop to reset said first flip-flop after a predetermined interval of travel of the carrier in the forward direction to stop the carrier.

6. A switching arrangement according to claim 5, wherein said second time delay circuit includes an output which provides the readiness signal upon resetting of said first flip-flop.

7. A switching arrangement according to claim 5, wherein said second time delay circuit has a time delay to provide a predetermined interval on the carrier between the last stored information block and the information to be stored.

8. A switching arrangement according to claim 5, wherein said third means comprises gating means having an input connected to the reading device, an input connected to an output of said second flip-flop, and an output connected to the reset input of said second flip-flop and to said second time delay circuit.

9. A switching arrangement according to claim 5, wherein said first and second timing circuits comprise respective counters, and further comprising a timing disc bearing periodic timing marks, said disc mounted for rotation by the carrier drive mechanism; and a scanning device connected to said counters and responsive to the timing marks to provide counting pulses and provide a definite association between the position of the carrier and the state of the switching arrangement.

10. A switching arrangement according to claim 5, wherein said first and second timing circuits comprise respective counters; and further comprising means for providing counting pulses to said counters in accordance with carrier movement to provide the respective time delays upon reaching respective predetermined counts.

11. A method of automatically detecting an information-free recordable location on a recording carrier which has spaced apart information blocks recorded thereon and which may be moved in forward and reverse directions, comprising the steps of:

moving the carrier in the forward direction while simultaneously reading information stored on the carrier by generating reading pulses in response to detection of such information;

reversing the direction of the carrier when reading pulses are no longer detected for a predetermined interval;

searching for information stored by generating and sensing reading pulses with the carrier moving in the reverse direction;

reversing movement of the carrier to the forward direction in response to sensing of reading pulses in the reverse direction;

moving the carrier in the forward direction for a predetermined time interval corresponding to the desired spacing between blocks of information; and stopping the carrier upon reaching the predetermined time interval.

12. The method of claim 11, wherein the step of moving the carrier are further defined as moving the carrier at a speed which is greater than the normal writing and reading speed.

* * * * *